United States Patent [19]

Bosley

[11] Patent Number: 5,014,049

[45] Date of Patent: May 7, 1991

[54] ELECTRONIC LOCK SYSTEM

[75] Inventor: Denis V. Bosley, Rancho Palos Verdes, Calif.

[73] Assignee: Multacc Corporation, Torrance, Calif.

[21] Appl. No.: 341,414

[22] Filed: Apr. 21, 1989

[51] Int. Cl.[5] ................................................ H04B 1/00

[52] U.S. Cl. ........................ 340/825.310; 340/825.330

[58] Field of Search ...................... 235/382, 382.5, 449, 235/492, 493; 340/825.3, 825.31, 825.33, 825.69, 825.72; 70/278

[56] References Cited

U.S. PATENT DOCUMENTS

| | | | |
|---|---|---|---|
| 4,596,985 | 6/1986 | Bongard et al. | 340/825.69 |
| 4,609,780 | 9/1986 | Clark | 340/825.31 |
| 4,727,368 | 2/1988 | Larson et al. | 340/825.31 |

FOREIGN PATENT DOCUMENTS

| | | | |
|---|---|---|---|
| WO87/05069 | 8/1987 | World Int. Prop. O. | 70/278 |

*Primary Examiner*—Donald J. Yusko
*Assistant Examiner*—Dervis Magistre
*Attorney, Agent, or Firm*—Allen A. Dicke, Jr.

[57] ABSTRACT

The electronic lock system is useful for a key safe where many different persons must have controlled, recorded access. Each user has a card key which is connected to one of a plurality of key safes to complete the system. The user inserts his personal identification number (PIN) into the card key in order to activate the card key. The card key is laid against a key safe so that an exchange of data takes place between key safe and card key to perform the security, access and control functions. The card key and key safe interact to exchange information so that the key safe may have memory of which card key is being used at which time, and vice versa. Updating of other memory functions can be accomplished. Validity is verified if a board number and a security level number in the card key relate correctly to their counterparts in the key safe and if the card identification (CID) number is not in the lock invalid CID number list. When valid, the key safe can be opened. By pressing in the key safe key compartment against a spring, the pole plate is pressed against its electromagnet. When the card key data have been verified, the electromagnet is turned on for a short period to hold the pole plate in released position. The key safe key compartment moves out away from latched position before the pole plate is released.

30 Claims, 4 Drawing Sheets

ELECTRONIC LOCK SYSTEM

FIELD OF THE INVENTION

This invention is directed to an electronic lock system wherein a card key is employed with a lock to gain access to a locked space, and particularly to a key safe system which allows different persons, each with his own card key and personal identification number, to open the locked space.

BACKGROUND OF THE INVENTION

There are a number of situations in which it is desirable to permit access to locked space by a plurality of different persons, but provide security of that access by requiring two separate elements to open the locked space. This prevents access by someone who has found a lost key, for example. A room in which medical drugs or valuables are stored, may require such security of access. Furthermore, it may be desirable to require a recording of those having access and the time that it occurred.

In real estate operations, in order to permit a number of different sales persons to have access to various properties for sale, key safes are used. The key safe is securely attached to the property and has a locked space therein in which the access device to the property is stored. This access device may be a key or it may be a card key. When a small real estate office having few salespersons has exclusive sales rights to several properties, the problem is not very complicated. Such may be a real estate office with a limited number of locks and a limited number of salespersons. A small number of locks permits changing of the locks when a salesperson terminates with the office. However, such is inconvenient even with a small office.

Key safes historically have been of the common key type where all users have an identical key. An improved type of key safe is the two-element input type where many different keys, each associated with a unique number, must be used to gain access. The improved type has the additional advantage of allowing recording of access and remains secure even if keys are lost. However, with these systems, if salespersons terminate there is no means of excluding them from the system other than by requiring them to give up their keys or by changing locks.

It is conventional in modern real estate sales practice for a group of real estate offices to band together for multiple listing. The group of real estate offices creates a real estate board which manages the multiple listing arrangement. Multiple listing means that the salespersons of any office belonging to the board can have access to any of the properties listed by the board. The number of key safes then becomes large, and it becomes very inconvenient to physically go out and change the key safes. Thus, when one of the salespersons terminates, the security of the key safe system is compromised unless that salesperson surrenders his/her key. Also, with such multiple listing systems, one of the offices may withdraw to create a larger scale compromise of security. In such a case, none of the salespersons from the withdrawn office would be entitled to access to the multiple listed properties. In these situations, a larger number of locks would have to be changed.

Thus, there is need for a system by which key safes can be attached at property available for sale and the key safes can be updated with new access information without the need for anyone going to each key safe specifically for updating its locking system or each key safe being transported to the board for updating its locking system. Due to the complexity of the problem, the real estate key safe system is considered to be a preferred embodiment of the electronic lock system of this invention, but there are other locked spaces to which an electronic lock system is also applicable, to enhance their security and reduce the need for direct security attention to each lock. Once hardware and software have been created to permit such remote updating, other desirable features, such as the routine collection of property showing data, become possible.

SUMMARY OF THE INVENTION

In order to aid in the understanding of this invention, it can be stated in essentially summary form that it is directed to an electronic lock system wherein an electronic lock is associated with each of a plurality of locked spaces and a card key is associated with each of a plurality of persons having potential access to each locked space. A card key is activated by having the card holder insert his personal identification number into the card. The card key is then placed in association with a lock and data is exchanged between the lock and the card key. When the lock memory recognizes the card key data as proper, the locked space can be opened. The card key will normally be activated before placing on the lock because it is physically easier to do so. The card key remains "alive" for about 10 seconds. At the Board's option, the card can be so activated and remain "armed" indefinitely for one opening of a lock to occur at any future time. The card would then be simply turned on, placed on the lock, and "OPN" key pressed. The Board can, of course, elect not to have this convenience option because there is a small security degradation in having it. It is decided before card distribution and programmed in (or out) of each card as it is issued. The exchange of data includes updating of memory in both the lock and the card key so that the card updates the lock memory as to previously authorized card identification numbers, whose access is now to be denied, and the lock updates the card key memory so that it can pass along all invalidated card identification numbers.

When the lock is a key safe, motion of the key safe key compartment causes momentary closure of a normally open limit switch, which powers up the electronics for a predetermined brief period and causes thrust of the latch pole plate against the electromagnet so that, upon release of the key compartment, if access is authorized, the pole plate is electromagnetically retained to permit key compartment opening.

It is thus an object and advantage of this invention to provide an electronic lock system wherein a locked space can be secured and access obtained thereto by means of a plurality of persons, each having his own card key and corresponding secret personal identification number (PIN), which must be entered correctly before the signals necessary for access to the locked space can be transmitted from the card to the lock and validated by the lock memory so that access is obtained only by a card key holder having knowledge of the secret PIN. Provision is made for the value of the PIN to be changeable as a security precaution. The old PIN must be used in order to be able to set a new PIN.

It is another object and advantage of this invention to provide an electronic lock system, particularly useful in connection with a set of real estate key safes, wherein each of a plurality of unique card keys can be individually associated with a plurality of unique locks, and the card key user activates his card key with his secret personal identification number. The card key user can have access to those locks where the lock memory validates current acceptance of the card identification number.

It is another object and advantage of this invention to employ a card key and key safe system wherein a plurality of such card keys and a plurality of such locks are inter-related to each other, and the card keys and locks exchange information between their memories so as to update their memories as to which previously issued card key identification numbers have been made invalid.

It is another object and advantage of this invention to provide a key safe wherein the structure is arranged so that a minimum amount of electrical energy is employed to operate the electronics and to actuate the unlocking electromagnet so as to maximize battery life. Only the key safe clock operates continuously. The microprocessor is off, except for a few milliseconds each minute to update time in the lock memory, or when the key compartment is pressed.

Other objects and advantages of this invention will become apparent from a study of the following portion of the specification, the claims and the attached drawings.

DESCRIPTION OF THE PREFERRED EMBODIMENT

Figure 1:
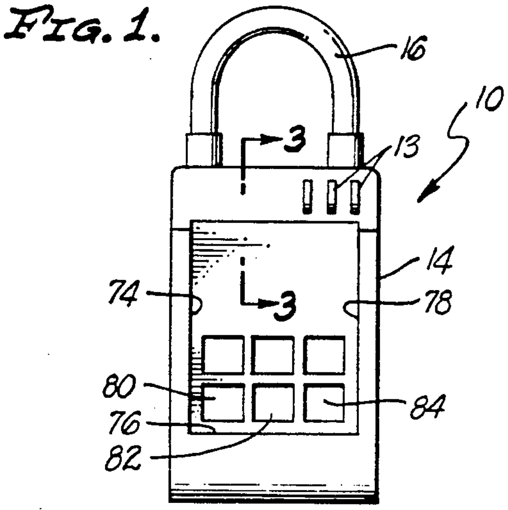
FIG. 1 is a front-elevational view of a key safe which forms a part of the electronic lock system of this invention.
Figure 2:
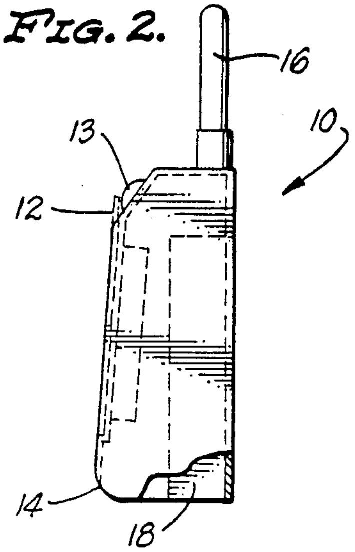
FIG. 2 is a side-elevational view thereof, with parts broken away and with a card in position.
Figure 8:
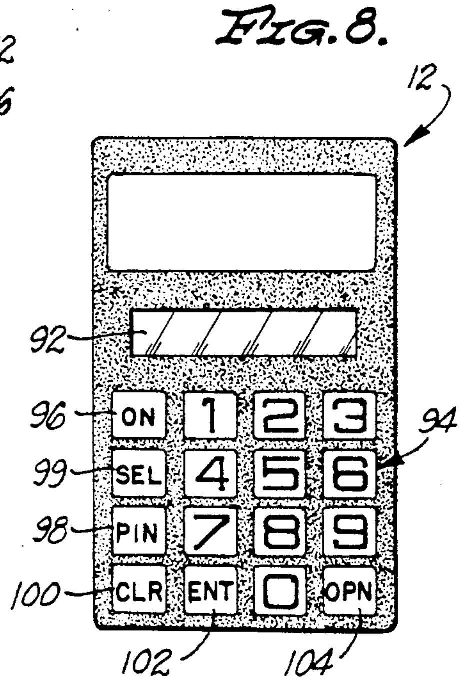
FIG. 8 is a plan view of the front of a card key.

The two principal portions of the electronic lock system of this invention are the lock 10, shown in elevation in FIGS. 1 and 2 and the card key 12 shown in front elevation in FIG. 8. These individual portions of the system interact in a manner to provide a useful locking system which permits access by those persons who are authorized and denies access by those persons who are not authorized. Furthermore, the system updates itself as to the state of authorization of particular card keys (and thereby particular card key holders) by interchanging data between the lock and card key when they are associated with each other. Furthermore, the lock system includes a plurality of locks, which may be at different locations, and a plurality of card keys, mostly in the possession of authorized users. The lock 10 is described as key safe, but this is the preferred embodiment, and the electronic lock system is applicable to other similar locking and security applications.

Lock 10 has a housing 14 which carries thereon shackle 16. The shackle 16 is sized to fit around the stem of a doorknob, railing or hose spigot so that the lock 10 may be placed thereon and retained in place, except by opening the shackle. The shackle is locked in place by any convenient and conventional lock structure, such as a key or a combination lock. Combination dials for the shackle are indicated at 13 in FIGS. 1 and 2. The locking of the shackle is not the particular subject matter of this invention. The lock housing has a slidable key compartment 18 therein, and it is access to this key compartment to which this invention is directed. The key compartment is sized so that, when open, several keys or door-opening card keys may be inserted therein and the key compartment may be closed and locked within housing 14 to prevent unauthorized access to the contents of the key compartment. In real estate usage, an authorized salesperson opens the key compartment and uses the key or card key therein to gain access to the real estate property he wishes to show. Thus, only authorized users should be permitted access.

Figure 9:
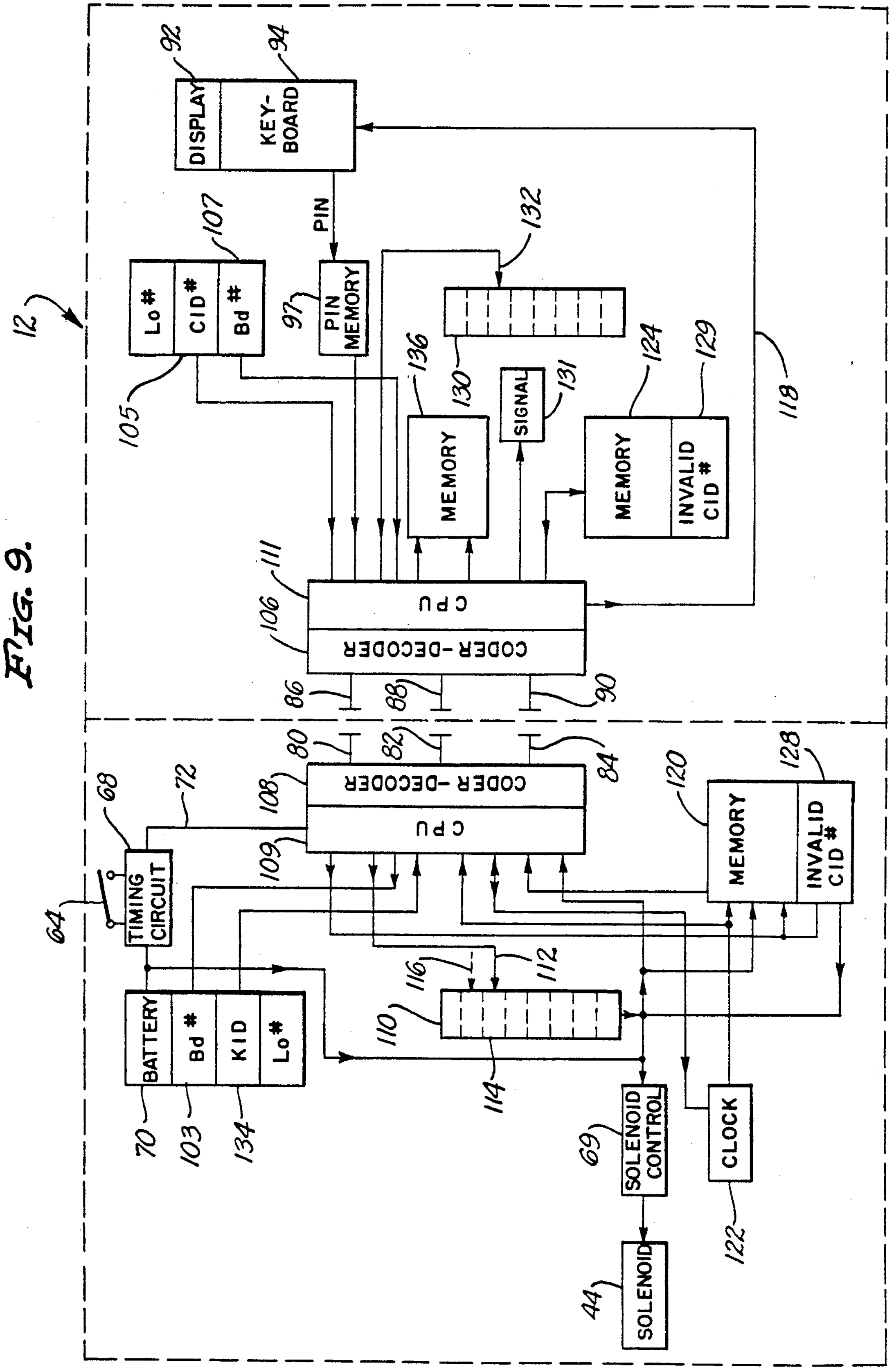
FIG. 9 is a schematic block diagram drawing of the various electronic and physical parts of the system and showing the lines by which they interact with each other.

The criteria by which access is permitted is electronically evaluated. Accordingly, there are electronic parts in both the card key and the lock, as shown in FIG. 9. The lock 10 may stay in place in a location away from convenient maintenance for a considerable length of time. Thus, the electronics should consume minimal power and the electromagnet for causing lock opening should consume only minimal energy to maximize battery life. As compared to a solenoid, the electromagnet/latch mechanism of this invention consumes very little energy.

Figure 3:
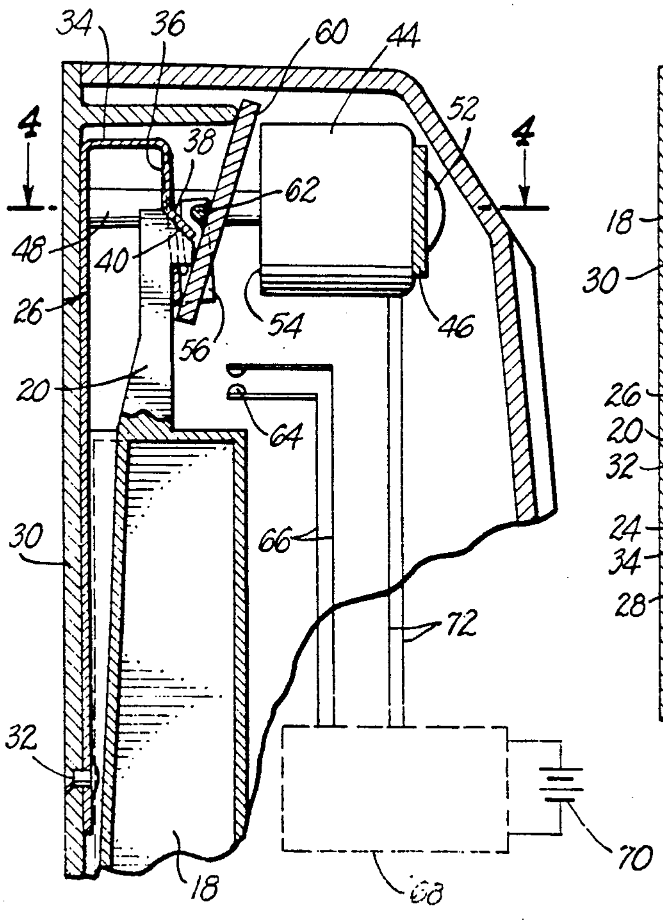
FIG. 3 is an enlarged section, taken generally along the line 3—3 of FIG. 1, showing the key safe key compartment-locking mechanism in the locked position.

Key compartment 18 is a sliding compartment. In FIG. 3, it is shown in its latched position wherein the bottom end of the key compartment, as seen in FIGURE 2, is flush with the general bottom surface of the lock housing 14. From that position, the sliding key compartment 18 can be pressed upward, which is inward into the lock housing a short distance to the position shown in FIG. 5. When the locking system permits release of the key compartment, it can slide downward through the position shown in broken lines in FIG. 6 to the position shown in FIG. 7. Formed as a part of the key compartment and extending upward is hook 20, which has a step 22 thereon for engagement against the latch. It is desirable to make a small undercut on the hook to prevent release of the key compartment when shocked by impact. Hook 20 has angular cam surface 24 thereon for thrusting the latch and pole plate 60 toward the electromagnet 44.

Figure 5:
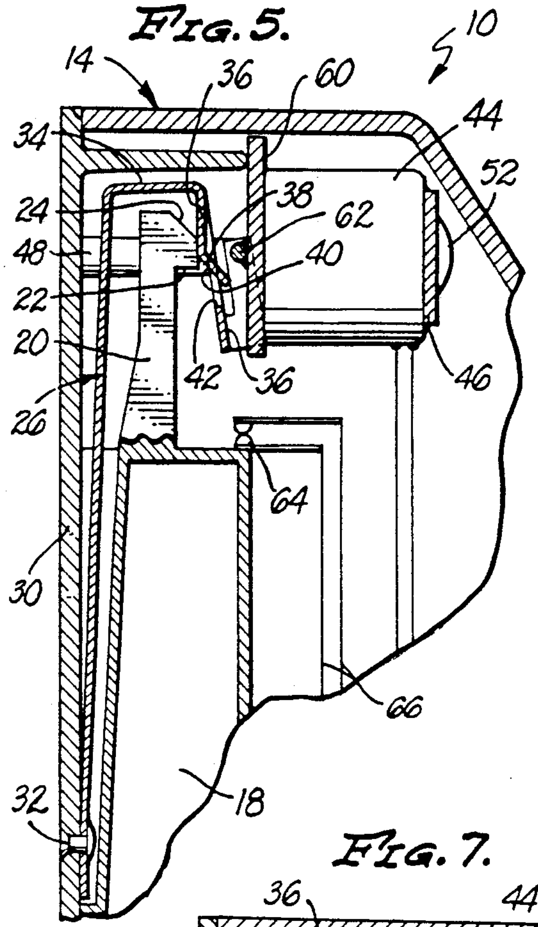
FIG. 5 is a view similar to FIG. 3, but showing the key compartment manually thrust to the upper position.
Figure 6:
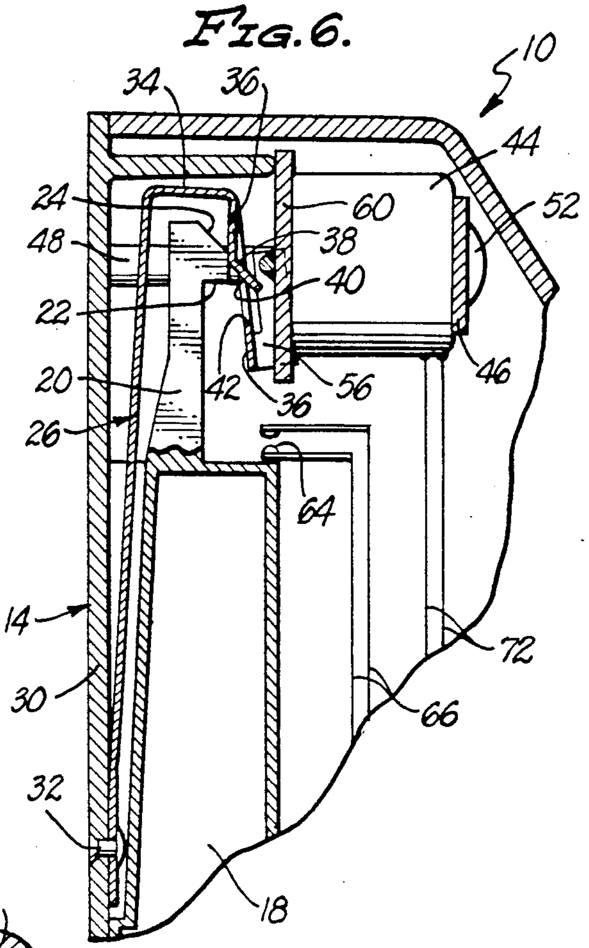
FIG. 6 is a view similar to FIG. 5, showing the beginning of release of the key safe key compartment where the signal switch is opened and showing in dashed lines the key compartment hook passing the electromagnet-retained latch.
Figure 7:
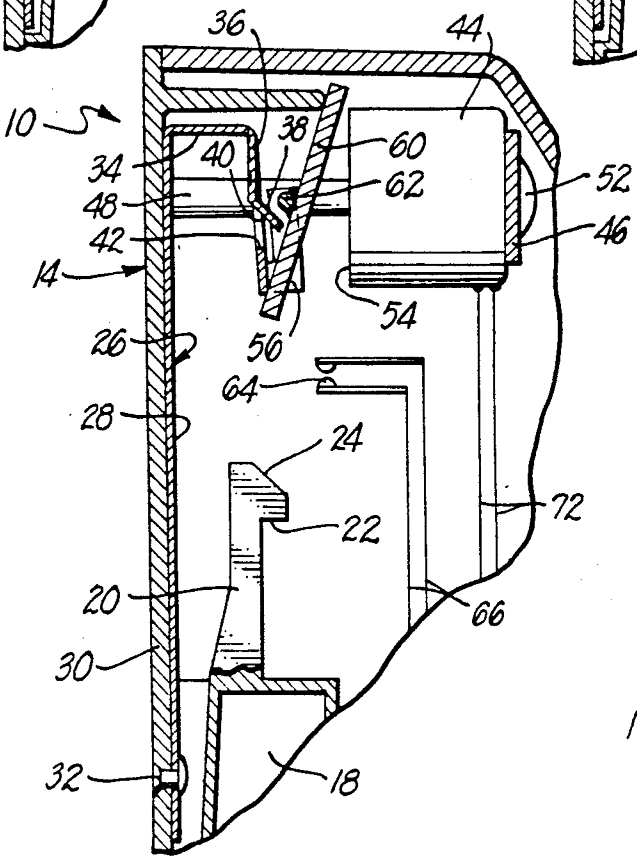
FIG. 7 is a similar view showing the key safe key compartment toward the open position.

Latch spring 26 has a back 28 which is secured to the back wall 30 of the lock housing 14 by any convenient means, such as rivet 32. The latch spring 26 is preloaded so that, when riveted in position on the back wall and when otherwise unengaged, it lies preloaded against the back wall, as is shown in FIG. 3. The upper part of the latch spring is formed with an inverted U-shaped structure, including cross member 34 and dependent panel 36. As is seen in FIGS. 5, 6 and 7, the dependent panel has an opening formed therein by pressing back a section to form ramp 38. The front of the ramp 38 has an angular face 40 which is at about the same angle as the cam surface 24, as seen in FIG. 3. The bottom edge of the opening is defined by latch edge 42. The hook 20 and the latch opening formed by the depression of the panel are positioned and sized so that, when the latch spring 26 lies against the back 28 of the lock housing, the latch opening is positioned to receive the nose on the hook, as seen in FIG. 3. In this position, step 22 on the key compartment engages against the latch edge 42 so that the key compartment is latched in place. When the key compartment is open, as seen in FIG. 7, latch spring 26 also lies against the back of the housing 14.

Figure 4:
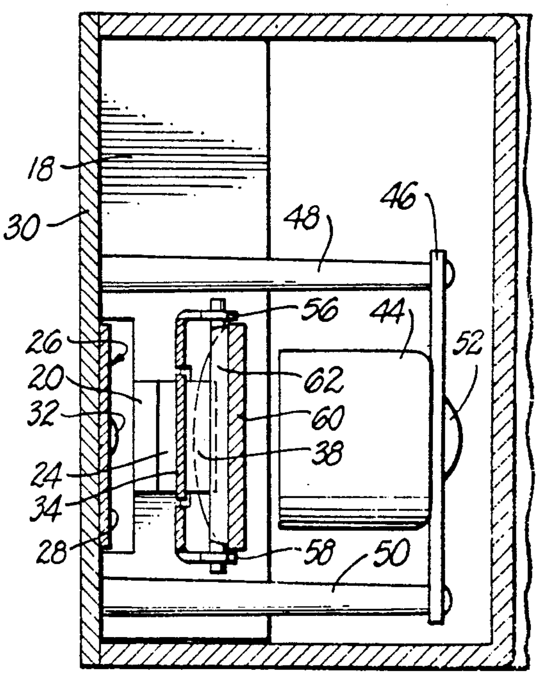
FIG. 4 is a sectional view of the key safe, taken generally along line 4—4 of FIG. 3.

Electromagnet 44 is carried on mounting plate 46, which is supported from the back of the housing on posts 48 and 50, see FIG. 4. Electromagnet 44 is cup-shaped to provide an annular outer pole and has a center pole therein which terminates in rivet head 52, which also retains the cup of the electromagnet on the mounting plate. The front 54 of the electromagnet is a planar surface comprising said annular pole and central pole and forming a magnetic circuit gap for receipt of a pole plate 60. The pole plate closes the magnetic gap and, therefore, can be securely held when the electromagnet is energized.

Ears 56 and 58 are turned up on the end of the latch spring beside the latch opening and beside the dependent panel 36, as seen in FIGS. 3, 4 and 6. Pole plate 60 carries a pivot pin 62 in the back thereof, and the pivot pin engages in corresponding pivot openings in the ears 56 and 58. In this way, the pole plate is pivoted on the latch spring. The parts are sized and positioned so that the pole plate can move against the planar front surface 54 of the electromagnet. Pivotal movement of the pole plate and a small amount of twisting of latch back 26 permits perfect alignment of the pole plate to the electromagnet poles. Resilience between the pole plate pivot holes in ears 56 and 58 and ramp 38 permits full contact of the pole plate to the electromagnet poles without excessive rearward loading of the key compartment.

Normally open contacts 64 are positioned in the path of key compartment 18, and when the key compartment is pushed upward past its normally latched position to the position shown in FIG. 5, the contacts are closed, energizing the key safe electronic module. The contacts are connected through lines 66 to electromagnet control circuit 69 which is connected to electromagnet 44 by lines 71. The electromagnet control circuit 69 has connected thereto a battery 70, and a timing circuit 68 which limits the time the lock circuit is energized. The timing circuit is connected by lines 72.

In the normal condition, the key compartment is locked in place, as shown in FIG. 3. To release the key compartment, the key compartment 18 is manually pressed upward. As the cam surface 24 moves upward on the angular face of ramp 38, the entire top of the latch spring is thrust toward the electromagnet pressing the pole plate 60 firmly against the flat front surface of the electromagnet. In addition, the switch contacts 64 are closed in the uppermost position of the key compartment 18. Upon release of the key compartment, a spring moves it downward. Contacts 64 open before the nose of the hook stops pressing the pole plate 60 against the electromagnet. This condition is shown in FIG. 6. The timing circuit and the solenoid control circuit 69 are such that, when the contacts 64 open and if all lock-opening conditions have been satisfied, the control circuit energizes the electromagnet for a very short period of time, for example 0.5 second. During this short period of energization of the electromagnet, manual release of the key compartment permits spring-urged downward motion of the key compartment 18 so that it moves the nose of the hook past the latch opening, as shown in dashed lines in FIG. 6, before the pole plate 60 is released from the electromagnet by termination of power thereto. As a consequence, the key compartment is released and moves down to the position shown in FIG. 7.

There are two important features of this structure and its function which conserve battery power. First of all, the pole plate 60 need not be drawn electromagnetically against the electromagnet face to cause unlocking. The thrusting of the pole plate against the electromagnet is caused by the hook engaging against the ramp on the latch spring. It takes much less electromagnet power to hold the pole plate in place with a given spring load, as compared to drawing it in. The second important feature is the fact that the switch contacts 64 detect the moment of opening and turn the power on in the lock circuit and solenoid only for the shortest permissible time to get the step 24 past the latch opening including latch edge 42.

Card key 12, shown in FIG. 8, is received in a recess in the front of the lock body. The recess is defined by shoulders 74, 76 and 78 which position the card key. The card key is shown in place in FIG. 2 and is seen to be substantially flush with the front of the lock. Three pairs of electrode ports, each having a signal and reference element, are provided for communication between the card key and the lock. The electrode ports may be direct electrical connection, magnetic coupling, or preferably capacitative coupling. Three pairs of ports 80, 82 and 84 on the lock are shown in FIGS. 1 and 9, while corresponding pairs of ports 86, 88 and 90 on the back of the card key are shown in FIG. 9. The six communications ports may be employed for data in, data in return, data out, data out return, clock and clock return, although other configurations are also useful. When the card key is placed on the lock, the ports are positioned for communication. As seen in FIG. 8, the card key has a display 92 thereon and a keyboard 94. In addition to a ten-key numerical pad, the keyboard also includes on (ON) key 96, personal identification number key (PIN) 98, select key (SEL) 99, clear key (CLR) 100, enter key (ENT)102, and open key (OPN) 104 thereon. The card key 12 contains a battery and active and passive electronics, including memory for a card identification number memory 105 and board number memory 107, as seen in FIG. 9. The card identification number (CID) stored in the card identification memory 105 is unique within the board(s) of one system. Other systems cards may have similar CID's, but will have different board numbers. The numbers stored in the board number memory 107 includes all boards to which the card holder has authorized access. The lock owner may be a different entity from one of the real estate offices that make up the board. Thus, a lock owner number (LO#) is provided. Memory space is allocated in both the card key memory 105 and lock memory 103 and is set by the board upon distribution. The purpose is to identify the card key (holder) as the person who should have access to a particular lock as a precedent to allowing access to certain owner type functions such as:

1. Reading the lock memory for card key activity;
2. Setting a time-out feature;
3. Displaying recent activity at the listing.

The card key also includes a personal identification number (PIN) memory 97 in which is stored the personal identification number of the user. This number is known to the user, and the card may be configured so that the memory 97 can be changed to receive a new PIN for a new user or receive a new PIN for the old user's convenience or to maintain secrecy.

The card key also includes a number of memory components. Memory 136 is provided to record the lock ID number and time at which the card key was utilized for later extraction and analysis of card key use data. Memory section 124 is a memory allocation which receives information from the lock memory on how the lock has been utilized. Associated with memory 124 is a list of invalid card identification numbers which are received from locks or the controlling computer and stored in memory 129. In order to prevent the list of invalid card identification numbers in memory 129 from becoming too long to be transferred in a reasonable amount of time, security number register 130 is included in the card key. The security number should be fairly large, such as a 16-bit value. This number is incremented during a security update, at which time the invalid CID number list in memory 129 is erased so that the time for transfer of invalid CID numbers becomes zero. When the security number register 110 is advanced in a lock, a time interval is started in the lock during which the previous security number and the recently advanced one are available for correlation comparison. During this interval, invalid CID numbers in memory 128 are used by the lock to inhibit access by card keys whose CID number is in the list, but this invalid CID number list is not transferred back to memory 129 in updated card keys. At the end of this interval, the list of invalid card identification numbers in memory 128 is erased so that the time for transfer of invalid CID numbers is reduced to zero.

A number of sequential operations occur with the card key, and it is necessary to advise the user when the card key is ready for the next operation so that the user can insert information into the card key by actuation of its keyboard 94. In order to advise the user of the fact that the card key is ready for the next operation, signal 131 is provided. This may be any type of signal which can inform the user of the ready state of the card key and may be visual, but is preferably audio. Each of the elements of the card key is connected through the central processing unit 111 to the coder-decoder 106. The pairs of ports 86, 87, 88 and 90 are connected through the coder-decoder so that the card key can communicate.

In order to activate a card key so that it can be used to open a lock (or to perform any other card key function), the "on" key 96 must be pressed and then the correct PIN entered. This activates the card key, and it may be done on or off the lock. Upon entering the last digit of the PIN number, the entered PIN number is compared with the correct PIN number in PIN number memory 97. If the user enters incorrectly, he can press the clear button 100 to permit a new entry of the number. When the user enters his correct PIN number, then presses the OPN key, and then places the card key in its recess on the front of the lock, the lock is ready to be opened.

The physical structure of the lock which represents a plurality of locks in the system has been previously described. It includes the pairs of communication ports 80, 82 and 84, which are positioned to communicate with the ports on the card key. The ports are connected to coder-decoder 108, which is in turn connected to the central processing unit 109, that controls the lock and transmits information between its various components and memories. Connected to the central processing unit is the battery 70, which is connected through timing circuit 68, which is controlled by switch 64 so that the battery is turned on a minimum time to do the data processing. The electromagnet control circuit 69 is powered from the battery, but energizes the electromagnet 44 only long enough to permit the user to open the lock. The lock also contains board number memory 103 which contains the board number of the Board which owns the lock. Only one board number need be stored. Furthermore, lock identification number memory 134 contains the lock identification, and only one number need be stored and no in-service changes are required. The lock contains memory 120 which records all usage of the lock, including the card identification numbers of the cards employed therewith, together with the time provided by clock 122. Associated with memory 120 is invalid card identification number memory 128, which is associated with the security number register 110. As seen in FIG. 9, the security number pointer 112 indicates the third number compartment 114 of register 110.

When the correct PIN number is entered into the card key and the card key is positioned on the lock, the pressing of the OPN button 104 causes a signal to be emitted to determine if it is coupled to an activated lock. If so, the lock detects this signal and returns a signal which causes the card key to send identification codes which, if accepted by the lock, will cause the lock to set itself ready for being opened.

A lock is normally in a power-off state, except for its clock, to save power. It is activated by closing switch contacts 64 and remains "alive" for about 10 seconds. This closure is effected by pushing in key compartment 18. Thus, pushing in the key compartment can switch the lock on, cause data exchange, and then open the lock.

Each set of locks may be owned and operated by a single Board of Realtors, as described above. Thus, each lock needs only a single board number to identify its board. The lock board number is stored in the lock board number memory 103. The card has a board number memory 107. Pressing the OPN key 104 causes transfer of the card key board numbers to the lock. The lock electronics compares the board number contained in the lock board number memory 103 to determine if it is included in the board number memory 107 in the card key The board number memory 107 may contain more than one board number because realty boards may join and share multiple listings. It may also be that a few individual salespersons, the card key users, have sales rights in two or more real estate boards, and therefore carry card keys in which several board numbers are stored in the card key board number memory 107.

Another set of information exchanged is the security number. The lock 10 has a security number memory which has a plurality of compartments. Pointer 112 indicates a particular compartment 114 which corresponds to a particular security number. Security number memory 130 in the card key 12 also has successive security numbers therein. The security numbers are compared by the lock, and the security number indicated by pointer 132 in the card key must be at least as advanced in the sequence as the security number indicated by the pointer 112 in the lock. If the lock is behind by one or more security numbers, the lock security number is advanced by moving the pointer to the matching compartment. This starts interval timing. The security number in the card key is not advanced by the lock, should it be behind, but if the card key security number is behind the security number in the lock, the lock will accept this condition for a period of time, for example one month, as indicated by the dashed line pointer 116 on memory 110. Thus, the security number in the card key must be up-to-date in order for the lock to open.

Another piece of information transmitted from card key to lock is the unique card key identification number in CID memory 105. This is transmitted for recording in the lock memory 120 so there is a record as to which card key was utilized to open the lock. The card key identification number in memory 105 is also compared to a list of invalid card key identification numbers in memory 128 in the lock. A list is kept in memory 128 of those card keys which are no longer valid for lock opening. The personal identification number remains in the card key and is never transmitted into the lock. The PIN number is utilized in the card key only so that the card key may be activated and thus able to exchange other information with the lock. This information enters coder-decoder 106 for serial communication of this information across the port interface. Coder-decoder 108 interprets this information and transmits it to lock memory 110. Requirements for lock opening are:

1. Card energized by entry of correct PIN.
2. Lock energized by pressing key compartment in.
3. One board number in the card memory corresponds to a board number in the lock.
4. Current value of security number in the card is equal to or in advance of the value in lock. (If the card key is one security level behind and the lock is in an interval period, opening is permitted. If the lock is behind, it is brought up to the latest value).
5. Card CID number is not in the list of invalid CID numbers.

When this various data is presented and validated, an output to the lock control circuit 68 is achieved. Thereupon, the open command by pressing button 104 is also transmitted back to the card so that the display 92 indicates "PUSH-UP". Thereupon, the user opens the lock by pressing up key compartment 18 and releasing it so that the key compartment opening spring, pressing the key compartment down in FIG. 6, moves the hook past the latch in the short time that the electromagnet is energized. If a stranger finds the card and attempts to employ it, he will not know the personal identification number, and thus all locks are secure. Counting circuitry is incorporated so that a stranger may only make a limited number of tries before the card key disables itself.

Memory 120 receives the information and stores each card key access in terms of the card identification number and time by use of clock 122. Both time and the CID number are then transferred back to memory 124 in the card so that the memory 124 is constantly updated with the history of the card key's use with locks.

There are occasions when particular card keys are no longer valid for the opening of a lock. Such occasions might arise when a salesperson leaves the employ of a real estate office. It is desirable to prevent access by that card key, even though the user knows his correct personal identification number. This is accomplished by having an invalid card identification number memory 128 in the lock. The exchanged information includes the card key identification number, and if the number is on the invalid list, the lock will not open. In order to pass along this information as to the latest list of invalid card key identification numbers, with each utilization of the lock, the list of invalid CID numbers is exchanged with the list of invalid CID numbers in the card key memory 129. The actual method of invalid CID propagation is:

1. The card transmits its current list to the lock;
2. The lock compares the new list with its own and adds any new ones to its list; and then
3. The lock transfers the new list back to the card.

In this way, each lock is updated with each utilization by the card key, and the card key list is updated with each utilization of a lock.

The exchange of data between the lock and card key is serial. First, the list of invalid card identification numbers in memory 129 is transmitted to memory 128 whereby the memory 128 is updated. Then, the list of invalid card key numbers in memory 128 is transmitted to memory 129, which is then updated. This spreads the list of invalid card key numbers throughout locks and card as they are used in the system, whether or not the card key 12 in that user's hand is valid or invalid. The information therefore spreads rapidly. If the invalid card key identification number list is too long, the time involved in transmitting information back and forth between the card key and lock becomes excessive. To limit the time involved in exchanging the long list of invalid card key identification numbers, the security number system is employed. When the list becomes too long, the controlling board may issue a new security number by updating the security number register in either one or more locks or card keys. As soon as this occurs in a lock or card key, the invalid card key memory is erased so that either lock or card key may start over again with a new list. As previously described, a new security number in a card key updates the security number of the lock in which it is employed, but the lock continues to honor the old security number for a limited time period after the security number has advanced; for example, one month, as indicated by the arrow 116. However, the lock never updates the security number in the card key. In this way, the list of invalid card key numbers does not reach such length as to cause excessive delay in lock operation.

Figure 11:
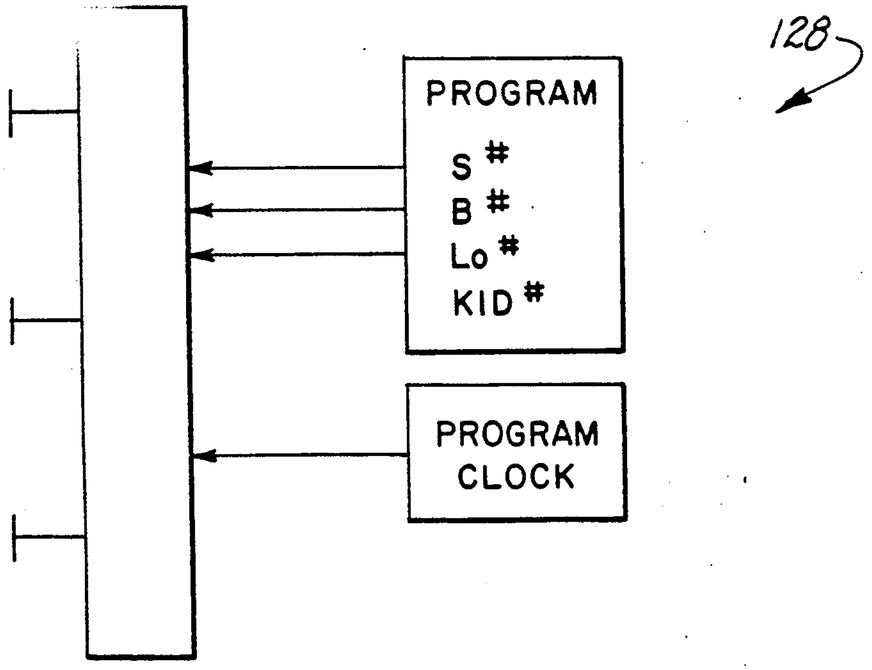
FIG. 11 is a diagrammatic view of the initial lock programming system.
Figure 1:
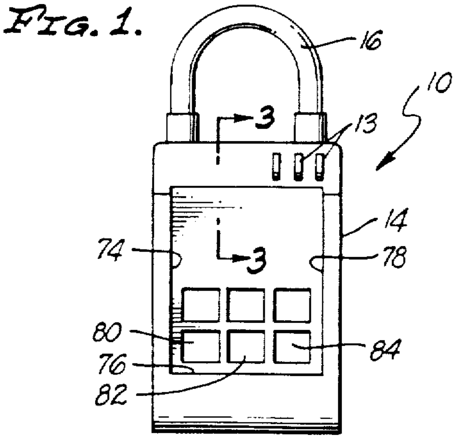
Figure 2:
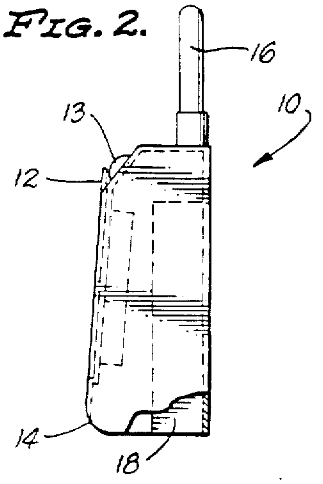
Figure 3:
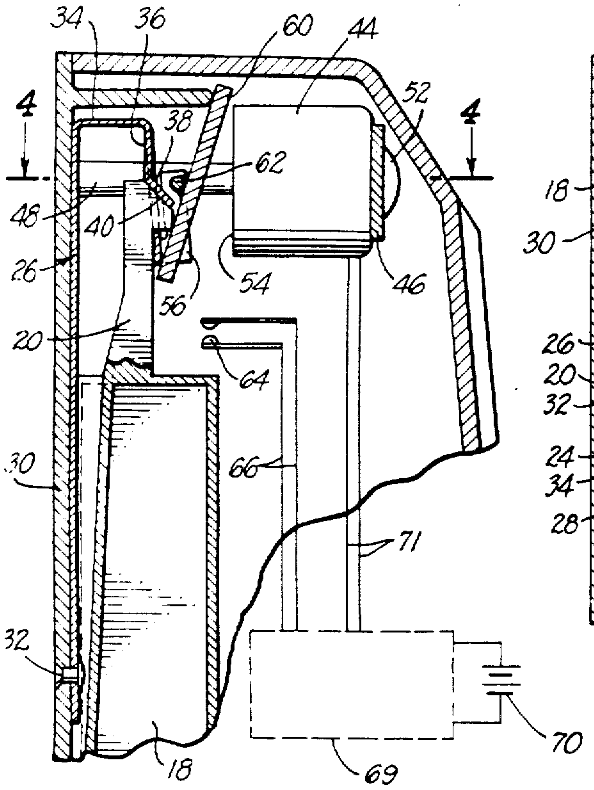
Figure 4:
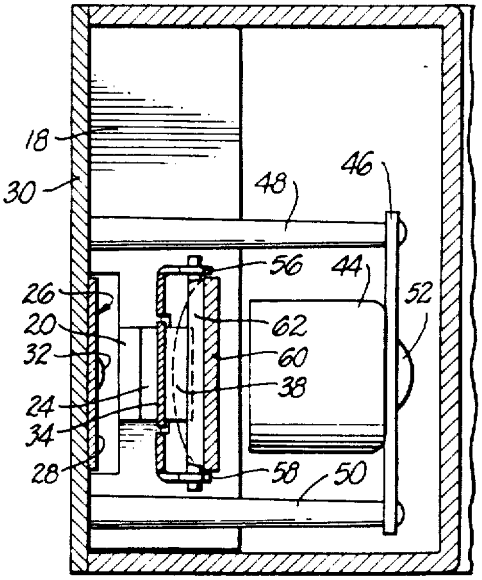
Figure 5:
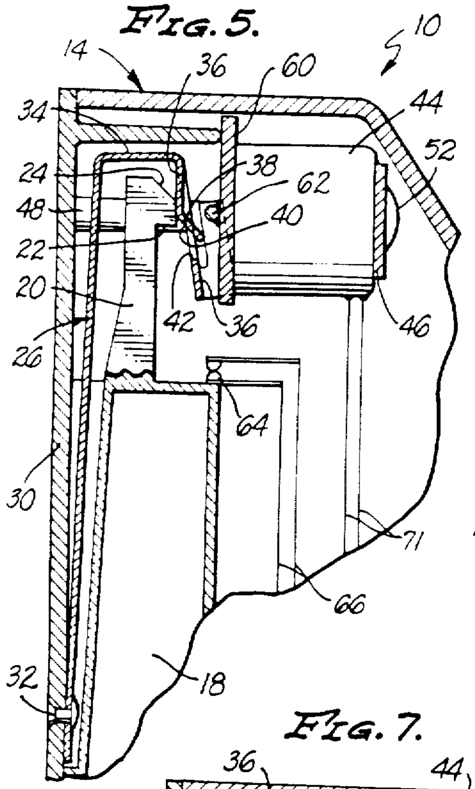
Figure 6:
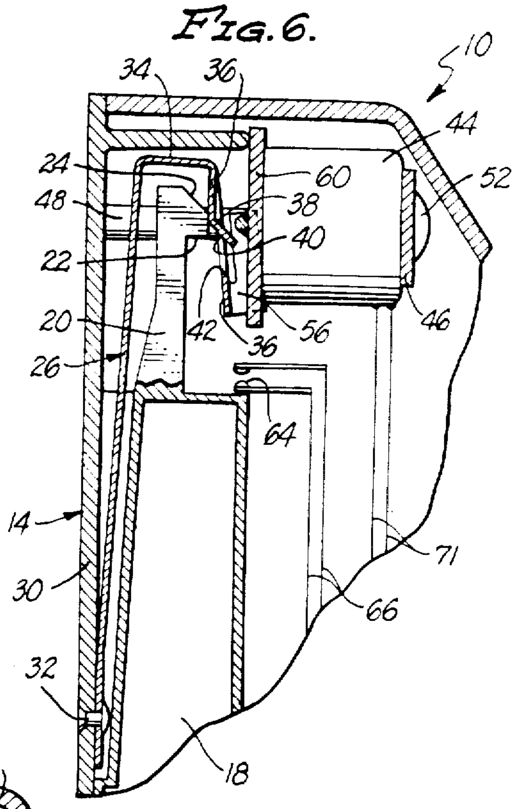
Figure 7:
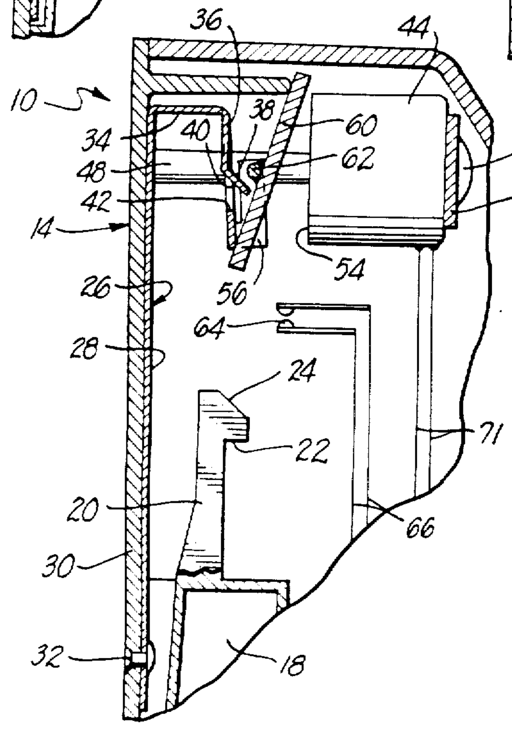
Figure 8:
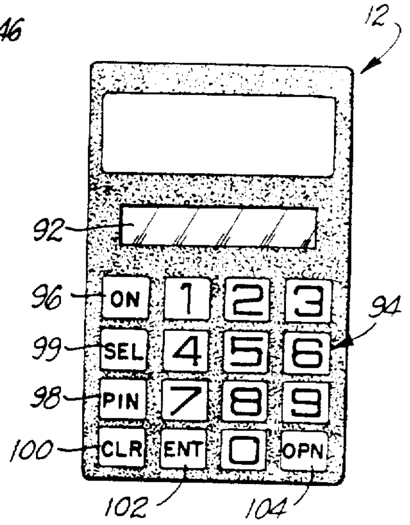
Figure 9:
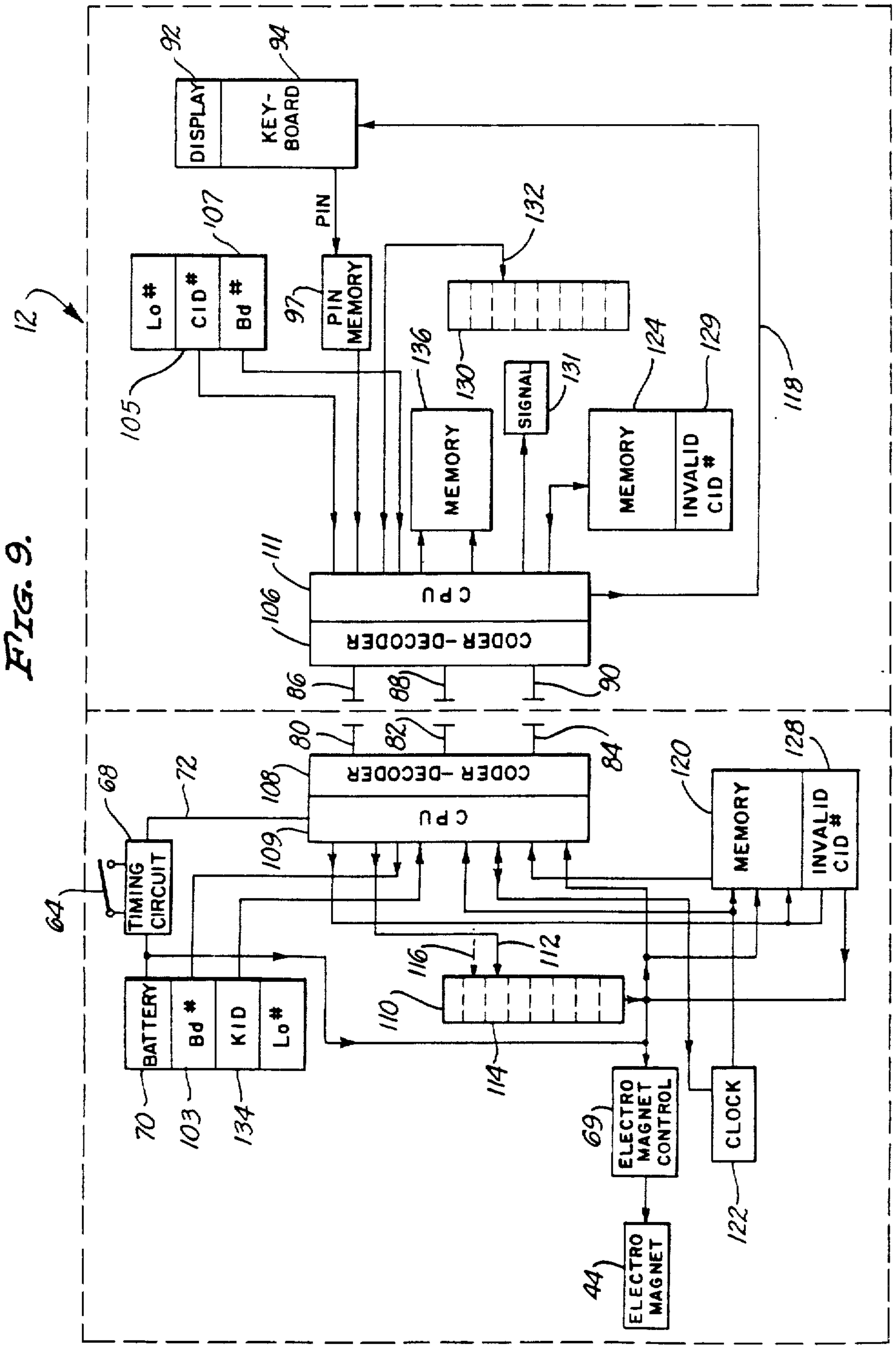
Figure 10:
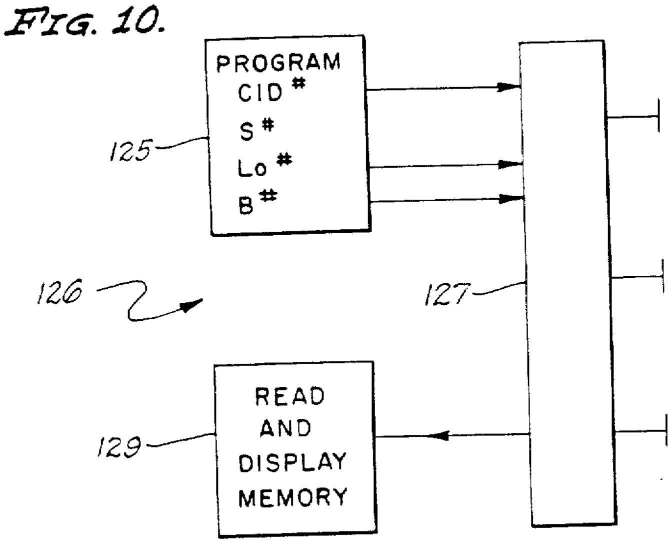
Figure 11:
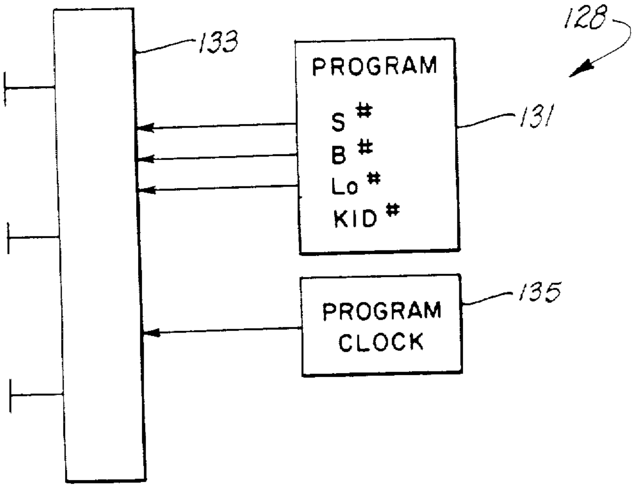

Each lock has a unique lock identification number (KID) and board number (B), which is programmed by the programmer in FIG. 11 when the lock is initially activated. The KID number and B number are stored in KID and B number memories 103 and 134. When a particular card key is used in association with the lock, the KID number, B number and the clock time are read into the memory 136. Then, when the memory 136 is interrogated, the usage of the card key may be determined.

In the usual real estate marketing situation, it is a brokerage which owns a set of locks. A broker owns and operates the brokerage and usually has several sales agents working for him. The locks owned by that brokerage are placed on real estate listed by that brokerage.

In multiple listing situations, these properties become available for showing and sale by all members of the real estate board to which that broker belongs. There is information in the lock memory 124 in the card key to which only the lock owner should have access. Therefore, an owner number is programmed into the memory of each lock and each card key. When these two owner numbers correspond, then the card key holder, who is the lock owner, has access to data in the lock memory.

Figure 10:
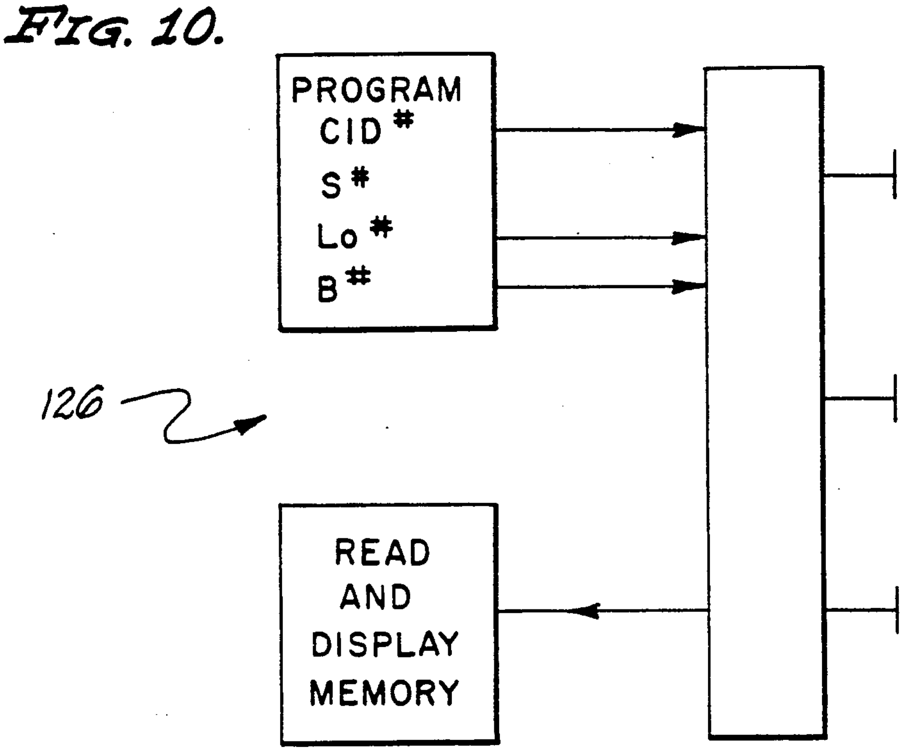
FIG. 10 is a diagrammatic view of the initial card key programming and reading system.

FIG. 10 shows a board-held programmer-reader 126 by which the board can program the card identification number, the security number, the board number B and the invalid CID number list in the original memory compartment. The programmer-reader can also read out the memory 124 and display its contents. The programmer reader includes an input 125 by which the original card identification number, security number, board number and lock owner are recorded into the card. The input 125 connects through computer-coder-decoder 127 which connects to the ports in the card. In reading the memory 124 by the lock owner, the memory is read out on display 129. The contents include the history of the use of the card key 12, in terms of the locks with which it has been used and associated time values.

Programmer 128 shown in FIG. 11 has ports which couple to the lock ports in order to set the clock 122 and set the board number, the original S-number and the information in the first memory compartment and any invalid CID numbers. Programming of the lock is accomplished through program input device 132 which acts through computer-coder-decoder 133. Clock 135 is set to the correct time.

In a preferred use, as described above, the lock system of this invention is useful in real estate sales situations in which a plurality of real estate sales offices each has a plurality of salespersons. In order to provide a broad availability of property for sale, sometimes a plurality of these offices reach an agreement for multiple listing of property. To accomplish this, they create a real estate multiple listing service. Each of the salespersons has access to each of the properties listed by the board. The card key is programmed with a card key identification number and board numbers in memory 105, and the security number or S-number register has its indicator 132 pointing at the first compartment in the security number register 130 in the card key. The S-numbers are the same in the lock and card key. At each entry of the card key into the lock, the S-numbers are compared. Lagging S-numbers in the locks are advanced to the latest card key value.

If a real estate salesperson leaves the employ of one of the offices or if one of the offices discontinues its relationship with the real estate board, access by the affected individuals into the locks must be terminated in order to maintain the security of the system. This may be accomplished by bringing all the locks 10 into the central location and reprogramming them with a programmer such as shown in FIG. 10. However, such is difficult because the plurality of locks 10 is dispersed over a wide number of locations and changing locks would require disruption of service or a duplicate lock set. The electronic lock system of this invention has a superior way of accomplishing the updating of the memories. Considering the system having locks 10 and card keys 12, only one or a few of the entire system need to be reprogrammed. When the card key is reprogrammed, a programmer such as is shown in FIG. 10 is employed. The invalid CID list in memory 129 is erased and a new S-number is programmed in to connect the operative system to the second compartment of the memory. Presuming a card key 12 is being reprogrammed, the second compartment of memory 130 would be indicated by pointer 132. When the programming or reprogramming of the card key 12 is completed, it is issued for normal service, and each time it is used in a lock 10, the S-numbers are compared. The lock 10 would not have an advanced S-number. The advanced S-number in the card key will now cause the S-number register 116 in the lock to be advanced to the same S-number as in the card key and cause the pointer 112 to advance to the second memory compartment. Each time a card key with an updated security number is used in a lock, the lock stores the updated security number in its own memory. The card key will not update its own security number, but will carry it and update the security number in any subsequent lock with which it is used. Thus, any card key, whether continuing to be valid or becoming invalid, will pass on the information and spread the information that the system is moving to a new security number. Each card key will require no reprogramming by the board level programmer or its delegate in order to receive the new security number. This may be accomplished by the board level programmer either directly or via the issuance, for instance by mail, of a key sequence which is unique for each card key, which will advance the card key security numbers. When the lock is set with its new security number and its overlap time created by pointer 116 has expired, the invalid card key number memory 128 is erased because all of the card keys updated by the office with a new security number will be valid. From then on, as individual cards are declared invalid, their CID numbers are inserted into the system and spread by communication both ways between locks and card keys. The updating thus spreads through the system. In this way, the entire system is updated without the need to bring in all of the locks for updating. Card keys which are to remain valid can be updated by the Board programmer directly or by mail.

In order for the board and/or the sales offices to obtain activity information, the memory 124 contains the latest information on all of the locks with which it has been used within its memory capacity. The memory 124 can be extracted at the board or at the sales office to collect useful information.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An electric lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

means in each said card key for electronic storage therein of a unique card key identification number;

means in each said card key for receiving and storing a personal identification number of a card key user;

an invalid card key identification number register in each said lock and an invalid card key identification number register in each said card key;

means for updating said invalid card key identification number register in said lock from said invalid card key identification number register in said card key when said card key is placed in communication with said lock;

means for updating said invalid card key identification number register in said card key from said invalid card key identification number register in said lock;

means for inhibiting access to all functions including opening of said lock by a card key when its card key identification number is listed in said invalid card key identification number register in said lock;

a security number register in each said lock and a security number register in each said card key, each said security number register having successive security states;

means for advancing said security number register in said lock from one state to the next in one direction only when said security number register in said card key is ahead of said security number register in said lock;

means for erasing said invalid card key identification number register in said lock and in said card key when said security number register is advanced;

means for inhibiting access to all functions including opening of said lock when said security number register of said lock is advanced beyond said security number register of said card key;

means for determining the correctness of a correlation between the personal identification number stored in the card key and the personal identification number entered by the user, as a condition for allowing access to all allowed functions and for signaling an unlocking signal when the correlation is correct; and means responsive to the unlocking signal to permit unlocking of said lock.

2. The electronic lock system of claim 1 further including:

means for storing a lock owner number in each of said locks to identify the owner of each of said locks and means in each of said card keys for storing a lock owner number in each of said card keys;

a display on said card key; and means for displaying information from said lock on said card key display which should be rightfully known only to the lock owner.

3. An electronic lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

means for storing a lock owner number in each of said locks to identify the owner of each of said locks;

a register in each said card key for electronic storage therein of a unique card key identification number;

a register in each said lock for electronic storage therein of a list of invalid card key identification numbers;

a register in each card key for electronic storage therein of invalid card key identification numbers;

means for causing said card key identification number register in said lock to update said invalid card key identification number register in said card key and for causing said invalid card key identification number register in said card key to update said invalid card key identification number register in said lock;

a security number register in said card key and a security number register in said lock;

means for permitting said security number register in said card key to advance said security number register in said lock and for erasing the invalid card key identification number register in said lock when the security number register in said card key is advanced.

4. The electronic lock system of claim 3 further including:

means for storing a board number in each of said locks to identify the affiliation of each of said locks and means in each of said card keys for storing at least one board number in each of said card keys; and means for comparing board numbers in said card key and in said lock, for allowing access to all allowed functions and for opening said lock only when its board number is found in said card key.

5. The electronic lock system of claim 3 further including:

a security number register in said lock and a security number register in said card key, said security number registers each comprising means for storing a number in memory and means for incrementally advancing the number stored in memory.

6. The electronic lock system of claim 3 further including:

a security number register in said lock and a security number register in said card key, each of said security number registers having successively indicated security numbers therein;

means for comparing the security number in said security number register in said card key with said security number register in said lock and advancing the security number in said lock to correlate correctly to the security number in said card key when said security number in said lock is behind said security number in said card key and inhibiting access to said lock when said security number in said lock is ahead of said security number in said card key.

7. The electronic lock system of claim 6 wherein:

said security number register comprises a memory for storing numerical values and said memory can be incremented by a predetermined value when said security number register memory in said lock is of lower value than the value in said security number register memory in said card key.

8. The electronic lock system of claim 3 further including:

means for inhibiting access to all functions including opening of said lock when attempted with a card key whose card key identification number is in said invalid card key identification number register in said lock.

9. The electronic lock system of claim 8 further including:

an invalid card key identification number memory in said card key and means for adding to the listing of invalid card key identification numbers in said card key memory from said lock memory each time said card key is utilized in a lock.

10. The electronic lock system of claim 9 wherein:

said lock includes a compartment which is openable to open a space by moving a panel;

an electromagnet in said lock and a pole plate movable against said electromagnet to be retained thereby, said electromagnet being connected to said locking circuit;

a latch edge and a hook positioned so that when said hook is engaged on said latch edge said panel is restrained from moving to a space-open position, one of said latch and said hook being connected to said pole plate and the other being connected to said panel;

means on said hook and said latch for thrusting said pole plate against said electromagnet so that when said pole plate is thrust against said electromagnet and power is supplied to said electromagnet, said latch and said hook are held out of latched position so that said panel can open access to said space.

11. The electronic lock system of claim 10 wherein there is a switch positioned to be closed when said pole plate is pressed against said electromagnet so that an electronic means for energizing said electromagnet at the instant that said switch changes from closed condition to open condition and to continue said energization for a time interval thereafter when said electromagnet is only actuated when said latch and hook are ready for release of said panel.

12. An electronic lock system comprising a plurality of locks and a plurality of card keys, each of said card keys being arranged for opening any of said locks, wherein each said lock includes a compartment which is openable to open a space by moving a panel;

an electromagnet in said lock and a pole plate movable against said electromagnet to be retainable thereby, said electromagnet being connected to said locking circuit;

a latch edge and a hook positioned so that when said hook is engaged on said latch edge said panel is restrained from moving to a space-open position, one of said latch and said hook being connected to said pole plate and the other being connected to said panel;

means on said hook and said latch for thrusting said pole plate against said electromagnet so that when said pole plate is thrust against said electromagnet and power is supplied to said electromagnet, said latch and said hook are held out of latched position so that said panel can open access to said space;

each of said locks and each of said card keys having at least one related communication port thereon so that when a card key is positioned with respect to one of said locks, said communication ports are positioned for communication;

means in each said card key for electronic storage therein of a unique card key identification number;

means in each said card key for receiving and storing a personal identification number of a key card user;

an invalid card key identification number register in each said lock and an invalid card key identification number register in each said card key;

means for updating said invalid card key identification number register in said lock from said invalid card key identification number register in said card key when said card key is placed in communication with said lock;

means for updating said invalid card key identification number register in said card key from said invalid card key identification number register in said lock;

means for inhibiting access to all functions including opening of said lock by a card key when its card key identification number is listed in said invalid card key identification number register in said lock when in communication;

a security number register in each said lock and a security number register in each said card key, each said security number register having successive security states;

means for advancing said security number register in said lock in one direction only when said security number register in said card key is ahead of said security number register in said lock;

means for erasing said invalid card key identification number register when said security number register is advanced;

means for inhibiting access to all functions including opening of said lock when said security number register of said lock is advanced beyond said security number register of said card key;

means for determining the correctness of a correlation between the personal identification number stored in the card key and the personal identification number entered by the user and for signaling access to all functions including an unlocking signal when the correlation is correct;

means responsive to the unlocking signal to permit unlocking of said lock.

13. The electronic lock system of claim 12 wherein there is a switch positioned to be actuated when said pole plate is pressed against said electromagnet so that said electromagnet is only actuated when said latch and hook are ready for release of said panel.

14. An electronic lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

means for storing a lock owner number in each of said locks to identify the owner of each of said locks;

means in each said card key for electronic storage therein of a unique card identification number;

means in each said card key for receiving and storing a personal identification number of a card key user;

means in each of said card keys for storing a lock owner number in each of said card keys;

means for determining the correctness of a correlation between the personal identification number stored in the card key and the personal identification number entered by the user and for signaling an unlocking signal when the correlation is correct;

means responsive to the unlocking signal to permit unlocking of said lock;

means for comparing lock owner numbers stored in said lock and said card key to determine correctness of correlation;

a display on said card key;

means for displaying information from the lock on the card key display which should be rightfully known only to the lock owner;

a security number register in said lock and a security number register in said card key, said security number registers each comprising means for storing a number in memory and means for incrementally advancing the number stored in memory;

an invalid card key identification number memory in said lock and means for inhibiting opening of said lock when opening is attempted with a card key whose card key identification number is in said invalid card key identification number memory in said lock; and means for erasing said invalid card key identification number memory when said security number register in said lock is advanced.

15. An electronic lock system comprising:

a plurality of locks, each of said locks having a unique lock identification number, a lock control circuit, a security number memory with a plurality of settings and a lock memory connected to actuate said lock control circuit and a communications port;

a plurality of card keys, each said card key having a unique identification number, having an input for inputting a personal identification number, a security number memory having a plurality of settings, a card key identification number memory and a communications port;

means for selecting one of said security number memory settings in said lock;

means for selecting one of said security number memory settings in said card key;

means associated with said lock security number memory and means associated with said card key security number memory for advancing said lock security number memory in one direction only to a new setting when the card key security number memory is in a more advanced state than of the lock;

an invalid card key identification number register in each said lock and an invalid card key identification number register in each said card key;

means for updating said invalid card key identification number register in said lock from said invalid card key identification number register in said card key when said card key is placed in communication with said lock;

means for updating said invalid card key identification number register in said card key from said invalid card key identification number register in said lock when said card key is placed in communication with said lock;

means for inhibiting all functions including opening of said lock by a card key when said card key identification number is listed in said invalid card key identification number register in said lock;

a security number register in each said lock and a security number register in each said card key, each said security number register having a successive security states;

means for advancing said security number register in said lock in one direction only when said security number register in said card key is ahead of said security number register in said lock;

means for erasing said invalid card key identification number register when said security number register is advanced; and means for inhibiting all allowed functions including opening of said lock by a card key when said security number register of said lock is advanced beyond said security number register of said card key.

16. The electronic lock system of claim 15 wherein a circuit in said lock and a circuit in said card key each define a security number corresponding to a memory setting and comparison of selected memory settings is made by comparing security numbers.

17. The electronic lock system of claim 16 wherein said card key contains a use memory which stores time and lock identification information therein with respect to card key usage with any one of said locks.

18. An electronic lock system comprising:

a plurality of locks, each of said locks having a communication port, a unique lock identification number, a lock control circuit, a security number memory with a plurality of settings and a lock memory connected to actuate said lock control circuit;

a plurality of card keys, each said card key having a unique personal identification number, each said card key having an input for inputting a personal identification number, a security number memory having a plurality of settings, a card key identification number memory and a communications port;

means for selecting one of said security number memory settings in said lock;

means for selecting one of said security number memory settings in said card key;

means associated with said lock security number memory and means associated with said card key security number memory for advancing said lock security number memory to a new setting in one direction only when the card key security number memory is in a more advanced state than that of the lock;

an invalid card key identification number register in each said lock and an invalid card key identification number register in each said card key;

means for updating said invalid card key identification number register in said lock from said invalid card key identification number register in said card key when said card key is placed in communication with said lock;

means for updating said invalid card key identification number register in said card key from said invalid card key identification number register in said lock when said card key is placed in communication with said lock;

means for inhibiting access to all functions including opening of said lock by a card key when said card key identification number is listed in said invalid card key identification number register in said lock;

a security number register in each said lock and a security number register in each said card key, each said security number register having advanceable security states;

means for advancing said security number register in said lock when said security number register in said card key is ahead of said security number register in said lock;

means for erasing said invalid card key identification number register when said security number register is advanced;

means for denying access to all functions including opening of said lock by a card key when said security number register of said lock is advanced beyond said security number register of said card key;

an invalid card key identification number register in said lock and means for inhibiting access to all functions including opening of said lock by a card key when the card key identification number of said card key is in said invalid card key identification number register of said lock; and means for erasing said invalid card key identification number register when said security number register in said lock is advanced.

19. The electronic lock system of claim 18 further including:

an invalid card key identification number memory in said card key and means for adding to the listing of invalid card key identification numbers in said card key memory from said lock memory each time said card key is utilized in a lock.

20. The electronic lock system of claim 18 further including means for changing the personal identification number of a card key from a first personal identification number to a second personal identification number only when the first personal identification number is entered into said card key.

21. An electronic lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

a security number register in said lock, said security number register comprising means for storing a number in memory and means for advancing the number stored in memory;

a security number register in each said card key, said security number register in each said card key each comprising means for storing a number in memory and means for advancing the number stored in memory;

means for determining the correctness of correlation between the security number stored in the security number register in said lock and said security number register in said card key and for signalling and unlocking signal when the correlation is correct;

means responsive to the unlocking signal to permit unlocking of said lock; and means for providing the unlocking signal for a limited time when the security number register in said card key is behind said security number register in said lock.

22. The electronic lock system of claim 21 further including a card identification number assigned to each said card key and means in each said card key for electronic storage therein of the unique card identification number;

means in each said lock and each said card key for storage therein of invalid card identification numbers so that when a card having an invalid card identification number is in communication with a lock, said lock will not produce an unlocking signal;

means for exchanging invalid card identification numbers between said lock and said card key even during the limited period when the security number of said lock is ahead of said security number in said card.

23. The electronic lock system of claim 22 further including means in said card for incrementing the security number in said lock.

24. The electronic lock system of claim 23 wherein said means for updating said security number is effective even during the limited period when said card key has its security number register behind the security number register in said lock.

25. The electronic lock system of claim 23 further including a programmer for use with one of said card keys for incrementing said security number register in said card.

26. The electronic lock system of claim 25 further including a programmer for use with one of said card keys for listing new invalid card identification numbers therein for exchange with locks with which said card key is in communication.

27. An electronic lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

a security number register in said lock, said security number register comprising means for storing a number in memory and means for incrementally advancing the number stored in memory;

a security number register in each said card key, said security number register in each said card key each comprising means for storing a number in memory and means for incrementally advancing the number stored in memory;

means for determining the correctness of correlation between the security number stored in the security number register in said lock and said security number register in said card key and for allowing access to all functions including signalling an unlocking signal when the correlation is correct;

means responsive to the unlocking signal to permit unlocking of said lock;

means for producing the unlocking signal for a limited time when the security number register in said card key is behind said security number register in said lock; and manual input means on each of said card keys, said manual input means being connected to said security number register for incrementing said security number register of said card key.

28. An electronic lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

a register in each said card key for electronic storage therein of a unique card key identification number;

a register in each said lock for electronic storage therein of a list of invalid card key identification numbers;

a register in each card key for electronic storage therein of invalid card key identification numbers;

means for causing said invalid card key identification number register in said lock to update said invalid card key identification number register in said card key, and for causing said invalid card key identification number register in said card key to update said invalid card key identification number register in said lock;

a security number register in said card key and a security number register in said lock;

means for permitting said security number register in said card key to advance said security number register in said lock and for erasing the invalid card key identification number register when the security register in said card is advanced; and means for providing access to all allowed functions and an unlocking signal in said lock for a limited time for card keys in which security number registers lag behind said security number register in said lock.

29. The electronic lock system of claim 28 further including means for disabling said card key when the card key identification number is found in said invalid card key identification number register.

30. An electronic lock system comprising a plurality of locks and a plurality of card keys, each of said card keys being arranged for opening any of said locks;

each of said locks and each of said card keys having at least one related communication port thereon so that when a card key is positioned with respect to one of said locks, said communication ports are positioned for communication;

a security number register in each of said locks;

a security number register in each of said card keys;

means in each of said card keys for signaling security number register advance in said lock with which it is in communication; and means for providing access to all allowed functions and an unlocking signal to the lock for a limited time for card keys whose security number registers lag behind said security number registers in said lock so that for a limited time a card key having a security number in its register which is behind the security number register in said lock can provide an unlock signal in said lock.

* * * * *

UNITED STATES PATENT AND TRADEMARK OFFICE

CERTIFICATE OF CORRECTION

PATENT NO. : 5,014,049

DATED : May 7, 1991

INVENTOR(S) : Denis V. Bosley

It is certified that error appears in the above-indentified patent and that said Letters Patent is hereby corrected as shown below:

The title page, showing the illustrative figure, should be deleted and substitute therefor the attached title page.

FIGS. 1-11 (Drawing Sheets 1-4), should be deleted and substitute therefor FIGS. 1-11, as shown on the attached pages.

Signed and Sealed this

Twentieth Day of July, 1993

Attest:

Michael K. Kirk

MICHAEL K. KIRK

*Attesting Officer*

*Acting Commissioner of Patents and Trademarks*

United States Patent [19]
Bosley
[11] Patent Number: 5,014,049
[45] Date of Patent: May 7, 1991

[54] ELECTRONIC LOCK SYSTEM

[75] Inventor: Denis V. Bosley, Rancho Palos Verdes, Calif.
[73] Assignee: Multacc Corporation, Torrance, Calif.

[21] Appl. No.: 341,414
[22] Filed: Apr. 21, 1989
[51] Int. Cl.[5] .............................................. H04B 1/00
[52] U.S. Cl. ...................... 340/825.310; 340/825.330
[58] Field of Search ..................... 235/382, 382.5, 449, 235/492, 493; 340/825.3, 825.31, 825.33, 825.69, 825.72; 70/278

[56] References Cited

U.S. PATENT DOCUMENTS 4,596,985 6/1986 Bongard et al. ............... 340/825.69
4,609,780 9/1986 Clark ............................. 340/825.31
4,727,368 2/1988 Larson et al. .................. 340/825.31

FOREIGN PATENT DOCUMENTS

WO87/05069 8/1987 World Int. Prop. O. ........... 70/278

*Primary Examiner*—Donald J. Yusko
*Assistant Examiner*—Dervis Magistre
*Attorney, Agent, or Firm*—Allen A. Dicke, Jr.

[57] ABSTRACT

The electronic lock system is useful for a key safe where many different persons must have controlled, recorded access. Each user has a card key which is connected to one of a plurality of key safes to complete the system. The user inserts his personal identification number (PIN) into the card key in order to activate the card key. The card key is laid against a key safe so that an exchange of data takes place between key safe and card key to perform the security, access and control functions. The card key and key safe interact to exchange information so that the key safe may have memory of which card key is being used at which time, and vice versa. Updating of other memory functions can be accomplished. Validity is verified if a board number and a security level number in the card key relate correctly to their counterparts in the key safe and if the card identification (CID) number is not in the lock invalid CID number list. When valid, the key safe can be opened. By pressing in the key safe key compartment against a spring, the pole plate is pressed against its electromagnet. When the card key data have been verified, the electromagnet is turned on for a short period to hold the pole plate in released position. The key safe key compartment moves out away from latched position before the pole plate is released.

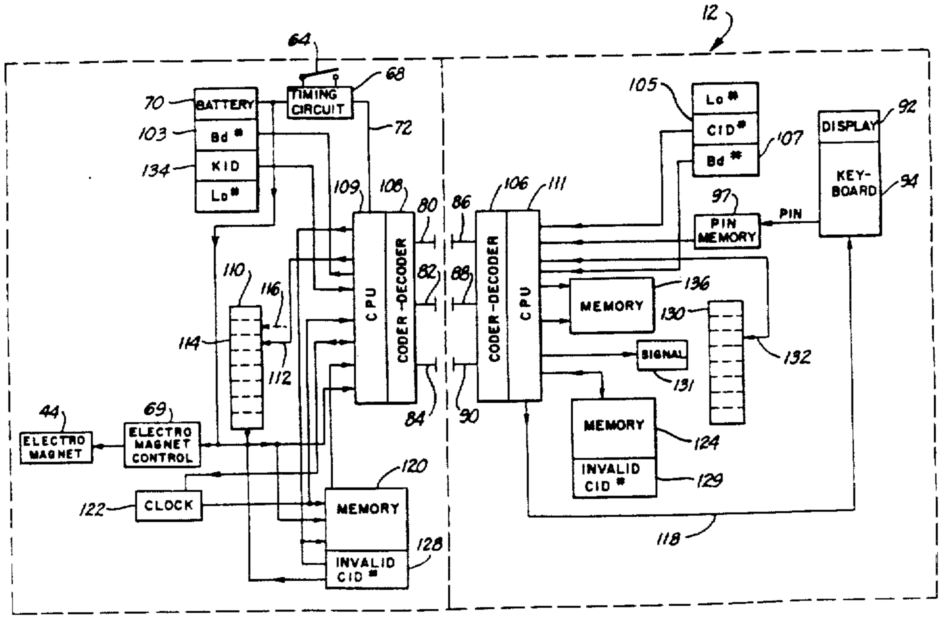

30 Claims, 4 Drawing Sheets